United States Patent [19]

Urakawa

[11] Patent Number: 5,359,460
[45] Date of Patent: Oct. 25, 1994

[54] POLYGON MIRROR FOR A LASER SCANNING OPTICAL SYSTEM

[75] Inventor: Toshio Urakawa, Yamatokoriyama, Japan

[73] Assignee: Sharp Kabushiki Kaisha, Osaka, Japan

[21] Appl. No.: 17,484

[22] Filed: Feb. 12, 1993

[30] Foreign Application Priority Data

Feb. 18, 1992 [JP] Japan .................................. 4-060945
Dec. 10, 1992 [JP] Japan .................................. 4-330639

[51] Int. Cl.⁵ ........................ G02B 26/10; G02B 5/08
[52] U.S. Cl. ...................................... 359/855; 359/198
[58] Field of Search ................ 359/850, 855, 856, 871, 359/216, 217, 218, 219, 198

[56] References Cited

U.S. PATENT DOCUMENTS

| 4,691,998 | 9/1987 | Sakagaito et al. | 359/855 |
| 4,892,372 | 1/1990 | Chonan et al. | 359/850 |
| 5,113,280 | 5/1992 | Kawasaki et al. | 359/196 |

FOREIGN PATENT DOCUMENTS

| 58-15650 | 3/1983 | Japan . | |
| 59-156216 | 10/1984 | Japan . | |
| 303316 | 12/1988 | Japan | 359/855 X |
| 1-160416 | 11/1989 | Japan . | |
| 170112 | 6/1990 | Japan | 359/871 |

Primary Examiner—Edward K. Look
Assistant Examiner—Michael S. Lee
Attorney, Agent, or Firm—David G. Conlin; George W. Neuner

[57] ABSTRACT

A polygon mirror is made by resin-forming and includes, at least on its referential surface for attachment, one or more kinds of elements selected from projections, hollow portions and through-holes. The hollow portions or through-holes are filled with an adhesive in contact with the referential surface for attachment. When only projections are used, pairs of projections are formed at corresponding positions on both the referential surface for attachment and the clamping member-receiving surface. When the polygon mirror is provided with projections in combination with hollow portions or through-holes, the projections penetrate through the respective hollow portions or through-holes.

7 Claims, 7 Drawing Sheets

POLYGON MIRROR FOR A LASER SCANNING OPTICAL SYSTEM

BACKGROUND OF THE INVENTION

(1) Field of the Invention

The present invention relates to a polygon mirror, and more particularly relates to a polygon mirror which is produced by resin-forming and is used especially for laser printers, plane paper facsimiles, and bar cord readers, etc.

(2) Description of the Related Art

Polygon mirrors for use in the laser scanning optical system used, for instance, in laser printers, etc. have been produced by lapping and polishing optical glass, or by performing super-fine cutting of a metallic material such as aluminum alloys etc. using a diamond cutter.

Figure 1:
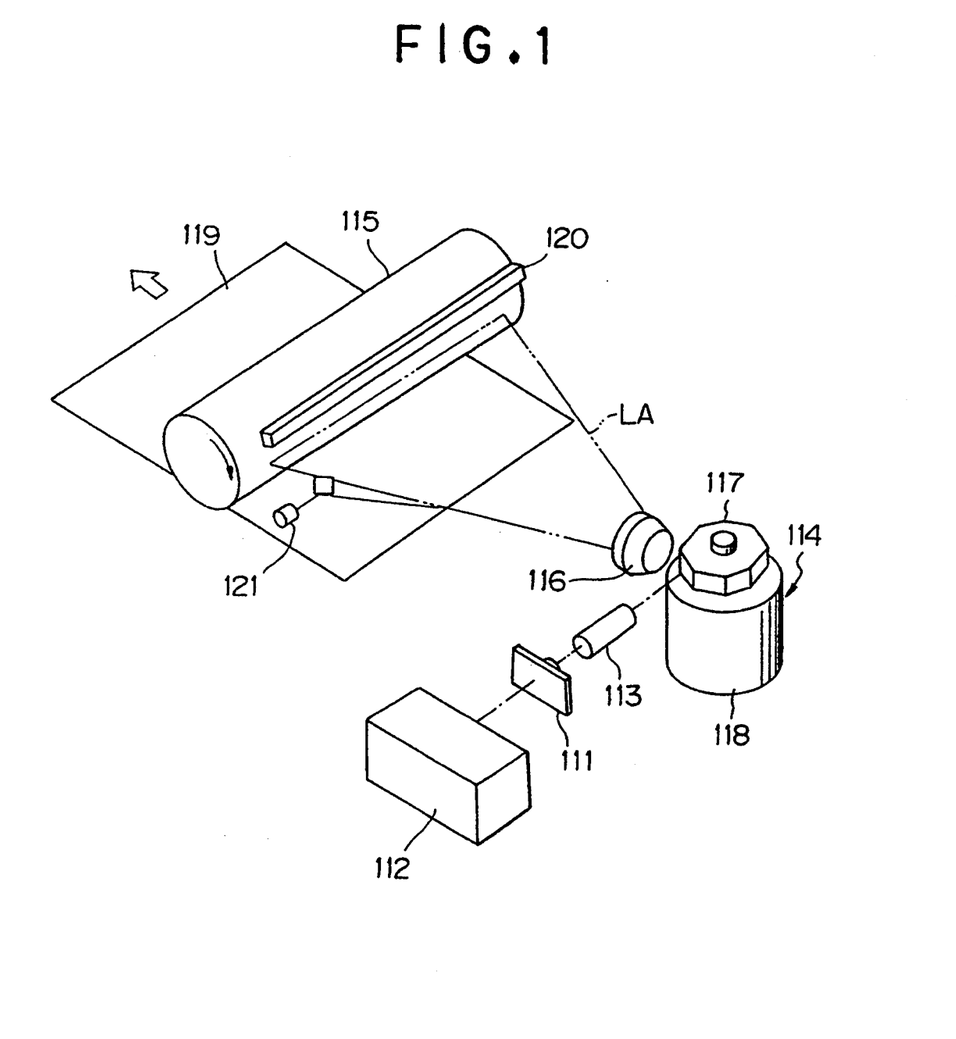
FIG. 1 is a perspective view showing a scanning optical system for use in a laser printer.

A laser printer employing such a laser scanning system is generally constructed as shown in FIG. 1.

Specifically, FIG. 1 is a perspective view showing a scanning optical system in a laser printer. The system is provided with a semiconductor laser oscillator 111 for generating laser light, a scanner controller 112 for turning on and off the laser oscillator 111, a collimator lens 113 for forming the laser light emitted from the oscillator 111 into collimated beams, a polygonal mirror device 114 reflecting the collimated laser beams from the collimator lens 113 depending upon revolving position, a f-$\theta$ lens 116 for forming a fine laser spot on a photoreceptor 115 from the collimated beams reflected on and from the polygonal mirror device 114.

In the above configurations, a polygon 117 of the polygonal mirror device 114, which is rotated at a high speed by a driving motor, deflects a laser beam LA in dependence upon its position, thus performing scanning in the longitudinal direction of the photoreceptor 115. In this while, the semiconductor laser oscillator 111 is modulated, to thereby create, a desired latent image on the photoreceptor 115, and the thus formed latent image is developed by the electrophotographic process to make a record on a printing sheet 119.

In the figure, reference numerals 120 and 121 denote a charger and a horizontal synchronization sensor, respectively. In recent years, an attempt has been made to manufacture polygon mirrors using resin moulding technique.

Figure 2:
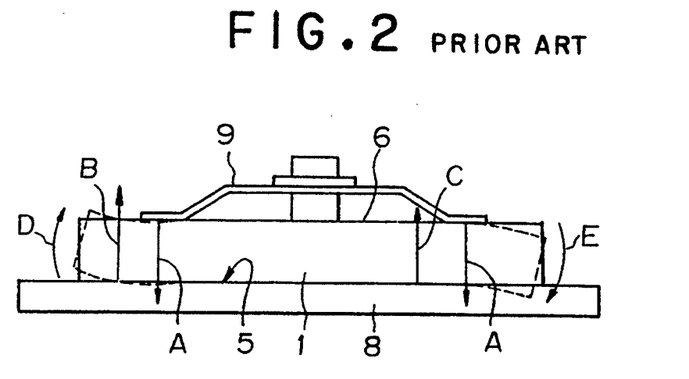
FIG. 2 is a side view showing an example of a mounted state of a prior art polygon mirror.

FIG.2 is a side view showing an example of mounting state of a polygon mirror having a conventional structure. Here, a polygon mirror 1 is mounted on a mirror mounting table 8 and pressed from the side of a clamping member-receiving surface toward the mirror mounting table 8 by a clamping member 9. As both the surface of the mirror mounting table 8 and the referential surface for attachment of the polygon mirror 1 in contact with the mirror mounting table 8 have an irregularity although being minute as in a level of microns, clamping stress A induces reaction force B, C, or etc., whose position cannot be expected. Accordingly, moment D and E occur, and cause a deformation although being minute as in a level of microns as shown in a broken line, particularly when a polygon mirror is made of a resin material which does not have as a large elasticity as metals. In the figure, the deformation shown by the broken line is depicted as if the polygonal member ate into the mounting table, but this is to show clearly that the polygon is deformed in the direction, and does not intend actual intrusion.

Since the light reflected by the mirror is laser light, this requires that the flatness of the mirror surface be within $\frac{1}{8}$ to $\frac{1}{8}$ $\lambda$ (wavelength of the laser light). Accordingly, if the above deformation occurs, the property of the reflected light is likely to change. In addition, each facet of the polygon is locally deformed so that the facet inclination error (the deviation from orthogonality of each mirror facet to the referential flat surface of the polygon mirror itself), is deteriorated.

Prior art polygon mirrors are attached in the following manners.

Japanese Utility Model Application Laid-Open Sho 59 No. 156216 discloses a fixing structure which comprises a mounting table securely fixed to a rotary shaft; and a rotational polygon mirror with a central hole, having a lager diameter than that of the rotary shaft and having a space for receiving a center adjuster thereinside on the side opposite the mounting table; and wherein the polygon mirror is coaxially positioned to the rotary shaft using a central adjuster.

A Japanese Patent Publication Sho 58 No. 15650 discloses a method of pressingly fixing a rotational polygon mirror used for a deflector deflecting laser beams and other light beams onto an attachment surface and conducting adjustment. But this structure needs a lot of parts for the pressing means, and to make matters worse, the parts are complicated, so the assemble takes labour and time thus increasing the cost.

Figure 3:
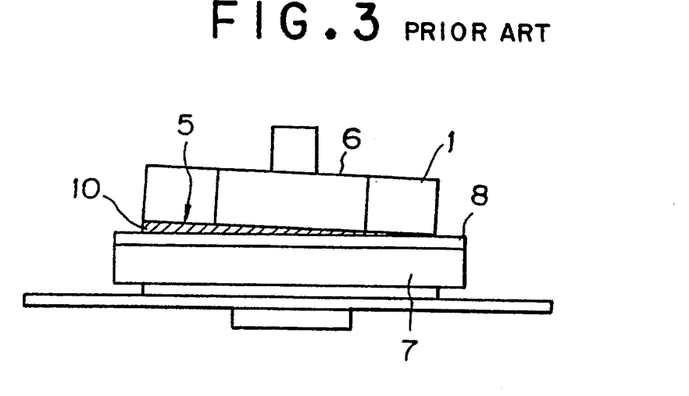
FIG. 3 is a side view showing another example of a mounted state of a prior art polygon mirror.

On the other hand, in place of using a clamping member 9 as shown in FIG. 2, a polygon mirror may conceivably be fixed as shown in FIG. 3 which exemplifies another side view of a different prior art attachment of a polygon mirror. In this case, the polygon mirror 1 is fixed by forming a layer of an adhesive 10 between a referential surface 5 for attachment of the polygon mirror 10 and a mirror mounting table 8 on a polygon driving motor 7. However, if the layer of adhesive 10 cannot be spread out uniformly, the unevenness of the layer of adhesive 10 would rather degrade the precision of the orthogonality of facets to the referential surface. In addition, there is another fear that the mirror facets may be stained while the polygon is fixed.

Another Japanese Utility Model Application Laid-Open Hei 1 No. 160416 proposes a method of positioning and fixing. In this structure, center-positioning and fixing of a polygon is effected such that a projection formed in the center of the rotational polygon mirror is engaged with a hollow provided in a corresponding position of a mirror mounting table, with an adhesive applied on the interface between the projection and the hollow. It is true that this fixing method can provide a more stable adhesion than the former method shown in FIG. 3 in which the flat surface of the polygon mirror 1 is simply cemented with the surface of the mirror mounting table 8. But the method only aims at regulating the center of rotation, therefore, the measure against deformation of the mirror is, certainly considered to a slight degree, but is not sufficient.

As what has been discussed heretofore, resin material has a smaller elasticity as compared with metallic materials, so a polygon mirror made of a resin material is easy to deform, that is, surface inclination of the mirror facets is increased and the flatness of the mirror facets are degraded by fixing stress caused by the attachment of the polygon to the motor for rotating. This has been a great obstacle to put the resin polygon into practice.

More specifically, combination of the fixing stress and its reacting force generates moment causing a micron-order deformation of the mirror, and the moment deforms the mirror facets.

SUMMARY OF THE INVENTION

It is therefore an object of the present invention to provide a simple method to prevent a resin-made polygon mirror from deforming as it is fixed, and to avoid the formation of an uneven adhesive layer as the polygon mirror is fixed to a mounting table with an adhesive agent.

The present invention has been achieved in order to attain the above object, and the main feature of the present invention is to provide a polygon mirror made by resin-forming, including at least on its referential surface for attachment a plurality of elements of one or more kinds selected from projections, hollow portions and through-holes, being characterized in that the hollow portions or through-holes are filled with an adhesive in contact with the referential surface for attachment. In the above case, when a plurality of projections are provided on its referential surface for attachment, a plurality of second projections are formed on a clamping member-receiving surface at positions opposite the first projections. In addition, the top flat area of the first projection on the referential surface for attachment is equal to or larger than that of the second projection on the clamping member-receiving surface.

At least three projections, hollow portions, or through-holes are preferably provided on each side of the polygon mirror. Further, it is effective that the hollow portions or through-holes are formed such as to penetrate through the respective projections.

In this arrangement, certainly, the mirror clamping member causes stress acting upon the polygon mirror through the projections in contact with the clamping member, as a result, reaction force pressing the end faces of the projections of the polygon in contact with the mounting table is caused. But the latter projections are disposed in correspondence with the former projections, so that no moment for deforming the mirror arises. Consequently, deformation of mirror facets or mirror facet inclination can be prevented.

Moreover, in accordance with the present invention, since the referential surface for attachment of the polygon mirror is adhered to the mirror mounting table by injecting the adhesive into the hollow portions or through-holes, uneven adhesive layers would not be formed, thus making it possible to prevent the deterioration of the facet inclination error.

DESCRIPTION OF THE PREFERRED EMBODIMENTS

The present invention will hereinafter be described in detail with reference to the accompanying drawings.

A polygon mirror in the invention is of rotary type used in well known laser scanning optical systems. The attachment of the mirror to a mounting table is basically carried out either by pressingly sandwiching the polygon mirror between the mounting table and a clamping member, or by injecting an adhesive into a space between the mounting table and the referential surface for attachment of the polygon mirror.

Preferable resin materials used for the polygon mirror include, for example, polycarbonate resin, acrylic resin, polyolefine resin, but resins other than these can be used in a proper manner. Resin compounds can be also used. As regards forming method, it is possible to choose any one of known resin-forming processes which are applicable to the particular forming.

Now, embodiments will be described with reference to the drawings.

Figure 4:
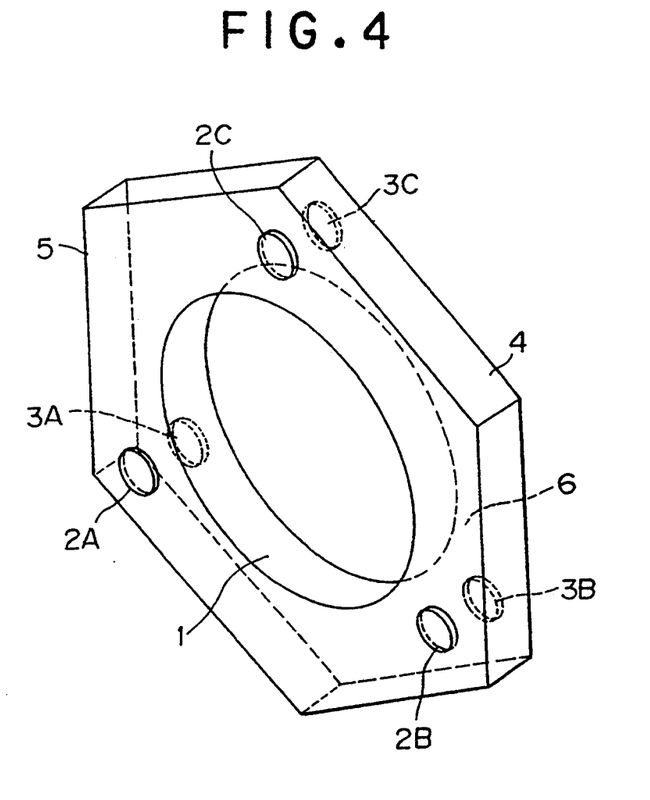
FIG. 4 is a perspective view showing an embodiment of a polygon mirror according to the present invention.

FIG. 4 is a perspective view showing an embodiment of a polygon mirror according to the present invention. In the figure, a polygon mirror 1 has six mirror facets 4 with a referential surface 5 for mounting and a clamping member-receiving surface 6. The surfaces 5 and 6 are formed with a plurality of projections respectively in the same positions but opposite sides.

Specifically, in FIG. 4, there is formed three projections 2A, 2B and 2C which will be in contact with the mounting table and therefore serve as the reference for attachment when an unillustrated motor is attached to the above referential surface 5 orthogonal to each mirror facets 4. In FIG. 4, these projections have a shape of a circle in their section, but the shape of the projections is not specified thereto. On the side opposite the referential surface 5, that is, on the clamping member-receiving surface 6, there are provided three projections 3A, 3B, 3C which are disposed in the opposite positions corresponding to the positions 2A, 2B, 2C, respectively. The flat portions of the projections 2A, 2B, 2C must be equal in diameter to those of the projections 3A, 3B, 3C.

Figure 5:
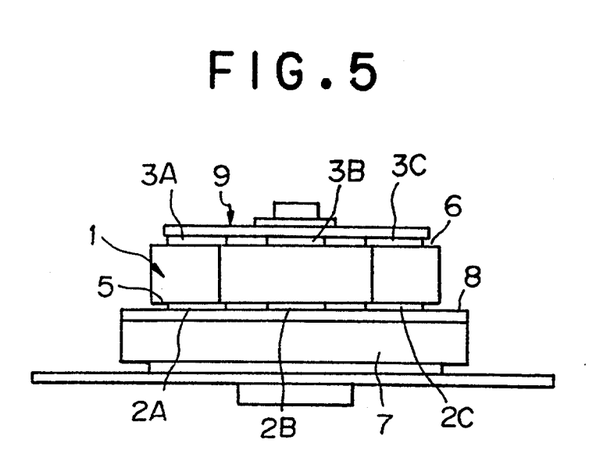
FIG. 5 is a side view showing a mounted state of the polygon mirror of the embodiment shown in FIG. 4.

Next, FIG. 5 shows a side view of the polygon mirror 1 of the embodiment shown in FIG. 4 being mounted on a polygon motor 7.

The polygon mirror 1 is in contact with a mirror mounting table 8 of the motor 7 only by the flat portions of the projections 2A, 2B, 2C, and no other part of the mirror 1 contacts with the table 8.

On the other hand, a mirror clamping member 9 fixes the polygon mirror 1 by contacting the flat portion of the projections 3A, 3B, 3C on the mirror 1. In this case, no other part of the mirror comes in contact with the mirror clamping member 9, either.

Accordingly, the fixing stress caused by the mirror clamping member 9 acts only on the flat portion of the projections 3A, 3B, 3C.

In the above case, the diameter of the projections 2A, 2B, 2C (on the referential surface 5 for attachment) may be greater than that of the projections 3A, 3B, 3C (on the clamping member-receiving surface 6), and the shape of the flat portions other than circle can also be allowed.

For instance, it is allowable that the flat portions of the projections 3A, 3B, 3C are formed of a triangle, whereas the flat portions of the projections 2A, 2B, 2C are of a circle, and vice versa. A slight positional deviation or shift in position of between the corresponding flat portions does not degrade the effect of the present invention as long as there is some overlapping portion. A more stable attachment of the polygon mirror 1 can be achieved if the flat portions of the projections on the referential surface 5 for attachment have an equal or greater area than that of the corresponding projections on the clamping member-receiving surface 6. This is because that in this state, the deformation moment less arises compared to the counter state.

The number of the projections on each side is preferably three or more, and optimally three.

In the above embodiment, the projections are disposed on the polygon mirror itself. On the contrary, if projections are not provided on the polygon mirror but are formed on the corresponding portions of the mirror mounting table and the mirror clamping member separately, positioning of the individual members, i.e. the table and the clamping member, to a proper position requires much trouble and time, resulting in high cost. In addition, making the clamping member from a metallic material needs a precise work. Furthermore, only a slight positional displacement may incur a greater deformation moment. The present invention is free from such problems.

Figure 6:
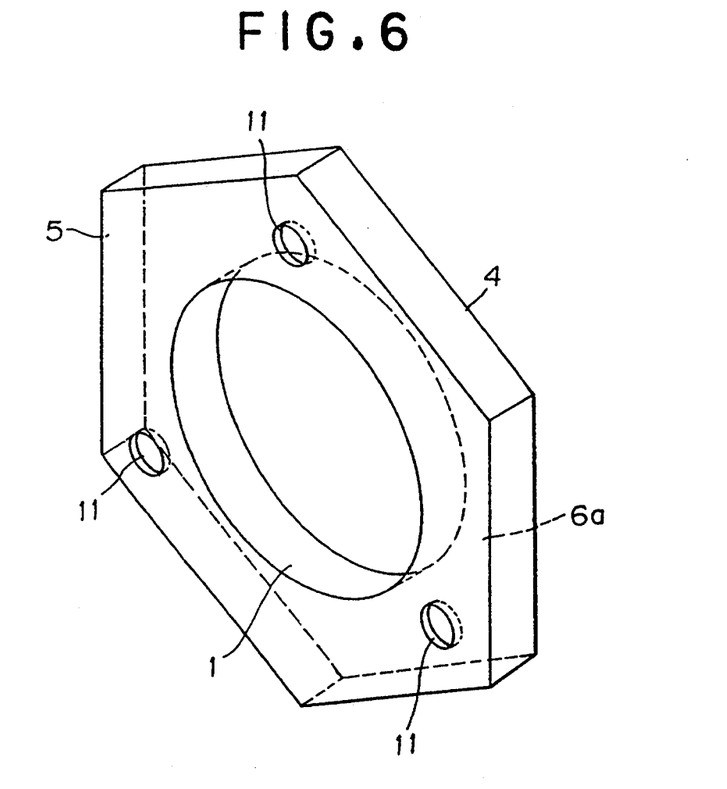
FIG. 6 is a perspective view showing another embodiment of a polygon mirror according to the present invention.

FIG. 6 is a perspective view showing another embodiment of the present invention. In this embodiment, a polygon mirror 1 having six mirror facets 4 is provided With plural hollows 11 opened on a referential surface 5 for attachment. The referential surface 5 for attachment must be flat enough with respect to the mirror facets 4 orthogonal thereto. On the other hand, as the hollows 11 are disposed only on the side of the referential surface 5 for attachment, the surface of opposite side 6a is not limited to any particular surface condition as long as it is substantially flat.

Figure 7:
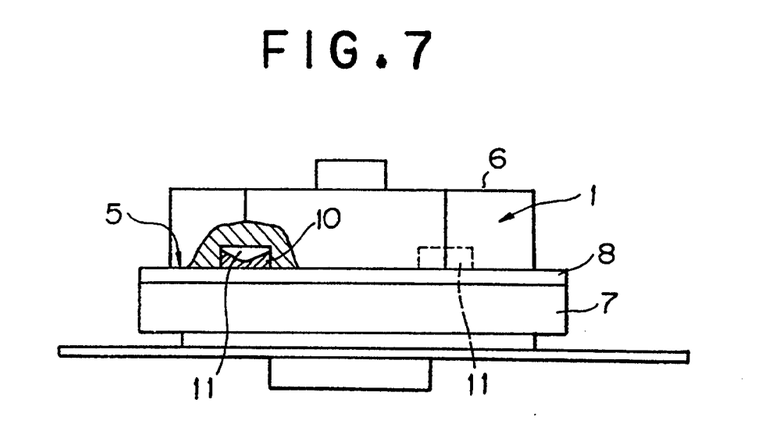
FIG. 7 is a side view with a partial cross-section showing a mounted state of the polygon mirror of the embodiment shown in FIG. 6.

According to the present invention, the polygon mirror is adhered and fixed to the mirror mounting table 8 by injecting an adhesive 10 into the thus formed hollows 11 as shown in a side with a partial cross-section in FIG. 7.

In the above case, the shape of the hollow 11 is not limited to a circle as shown in FIG. 6, but may be possible to be a square, a triangle or any other pattern. The number of the hollows 11 is not either limited to three as shown in the figure, but will do as long as it is plural. Further, concerning the depth and the cross-sectional area of the hollow 11, arbitrary dimensions can be selected as long as such characteristics as the practical strength of the polygon mirror 1 is not jeopardized.

Still more, this embodiment requires no mirror clamping member 9 as used in FIG. 5, so there is no necessity for considering the fixing stress that would be caused by the clamping member 9.

Figure 8:
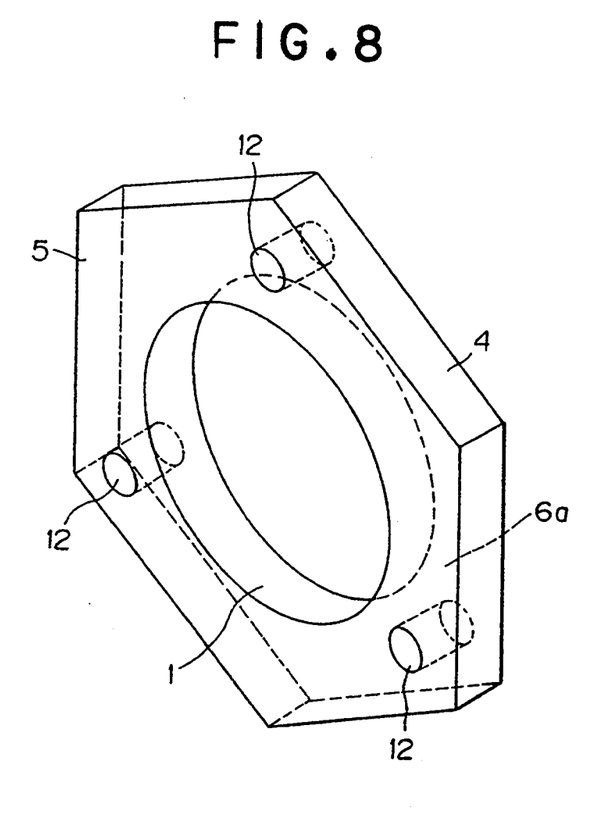
FIG. 8 is a perspective view showing still another embodiment of a polygon mirror according to the present invention.

FIG. 8 is a perspective view showing another embodiment of the present invention. In accordance with the embodiment shown in the figure, a polygon mirror 1 with six mirror facets 4 are provided with plural through-holes 12 which are drilled penetrating from a referential surface 5 for attachment to the opposite side 6a. The referential surface 5 for attachment must be flat enough with respect to the mirror facets 4 orthogonal thereto, but the opposite side 6a is not limited to a particular surface condition as long as it is substantially flat.

Since the through holes 12 are opened, needless to say, on both sides of the referential surface 5 for attachment and the opposite surface 6a, the injection of the adhesive is easier than the case where the hollows 11 are adopted in accordance with the embodiment shown in FIGS. 6 and 7.

Figure 9:
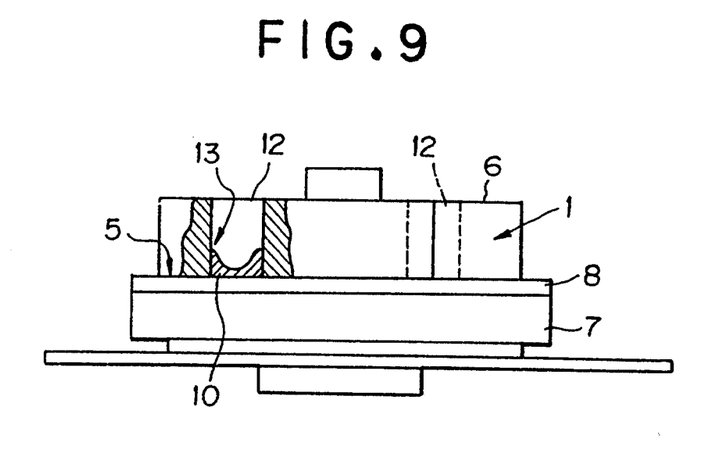
FIG. 9 is a side view with a partial cross-section showing a mounted state of the polygon mirror of the embodiment shown in FIG. 8.

Once more, in the present invention, as shown in the side view with a partial cross-section of FIG. 9, the adhesive 10 is injected into the through-holes 12 to adhere and fix the polygon mirror 1 to the mirror mounting table 8. With this, the adhesive 10 becomes cemented on inner walls 13 of the through-halls 12, thus the polygon mirror 1 will be securely fixed.

In the above case, the cross-sectional shape of the through-hole 12 is not limited to a circle as shown in FIG. 8, but may be possible to be a square, a triangle or any other pattern. The number of the through-holes is not either limited to three as shown in the figure, but will do as long as it is plural.

Further, concerning the cross-sectional area of the through hole 12, an arbitrary dimension can be selected as long as such characteristics as the practical strength of the polygon mirror 1 is not jeopardized. Still more, this embodiment neither requires mirror clamping member 9 as is used in FIG. 5, so there is no necessity for considering the fixing stress that would be caused by the clamping member 9.

Figure 10:
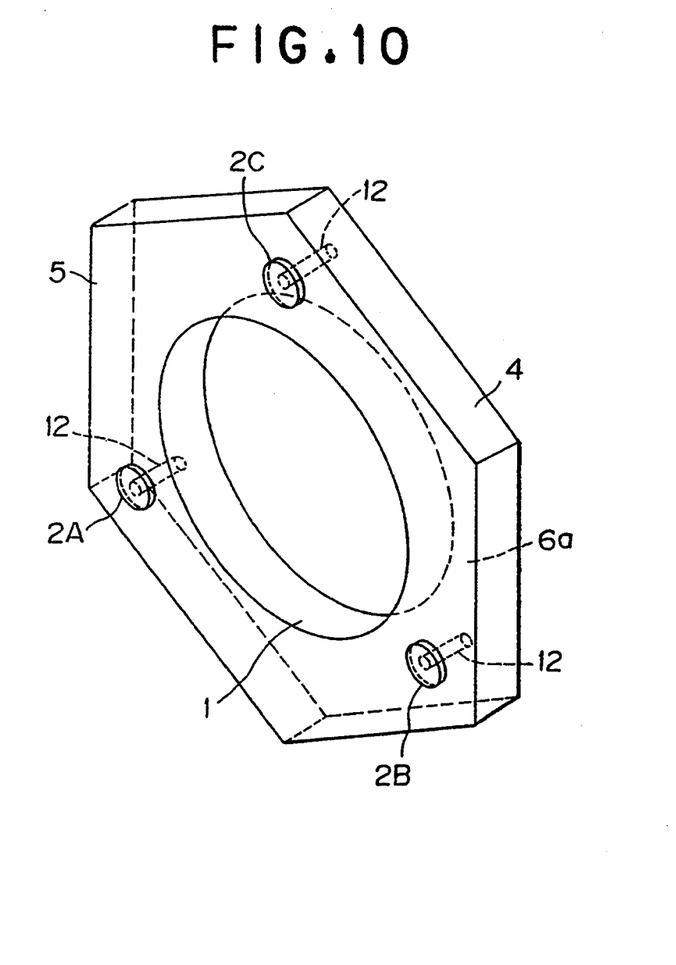
FIG. 10 is a perspective view showing a further embodiment of a polygon mirror according to the present invention.

FIG. 10 is a perspective view showing still another embodiment in which various features of the embodiments above-described of the invention are combined. That is, like the embodiment shown in FIG. 4 in which the polygon mirror 1 with six mirror facets 4 is provided with projections, projections 2A, 2B, 2C are provided only on the side of the referential surface 5 for attachment, while through-holes are disposed such as to penetrate through the projections 2A, 2B, 2C.

More specifically, in this case, the projections 2A to 2C are integrally formed on the referential surface 5 with the polygon mirror 1, while the through-holes 12 are drilled respectively penetrating from the opposite surface 6a to the substantially central portions of the projections 2A to 2C.

Figure 11:
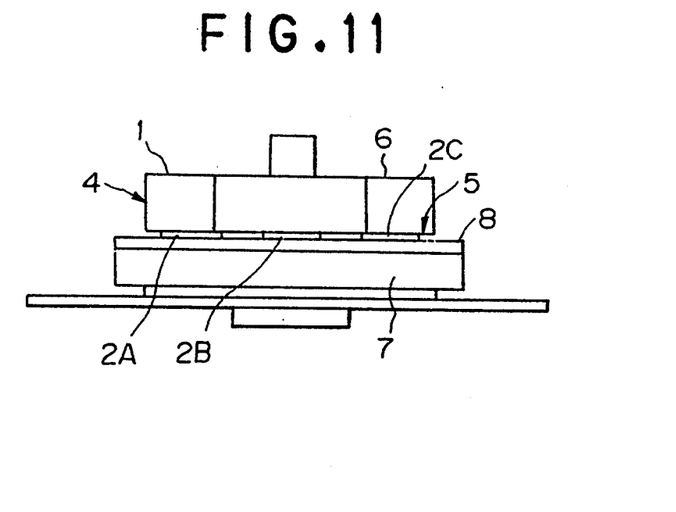
FIG. 11 is a side view showing a mounted state of the polygon mirror of the embodiment shown in FIG. 10.

These projections 2A to 2C are to serve as reference for attachment when the polygon mirror 1 is attached to the mirror motor 7 through the mirror mounting table 8 as shown in a side view of FIG. 11. That is, the polygon mirror 7 is in contact with the mirror mounting table 8 only by the top flat portions of the projections 2A, 2B, 2C, and no other part of the mirror 1 contacts with the table 8. In this embodiment, the through-holes 12, which are drilled to penetrate through respective projections 2A to 2C, are filled with an adhesive 10 to fix the polygon mirror 1. However, differing from the embodiment shown in FIGS. 8 and 9, the referential surface 5 for attachment as a whole does not come in direct contact with the mirror mounting table 8, but the polygon mirror 1 is supported via the projections 2A to 2C. Accordingly, the flatness of the referential surface 5 for attachment is not needed to a high degree, and it is sufficient that only the end faces of the projections 2A to 2C are flatted properly.

Figure 12:
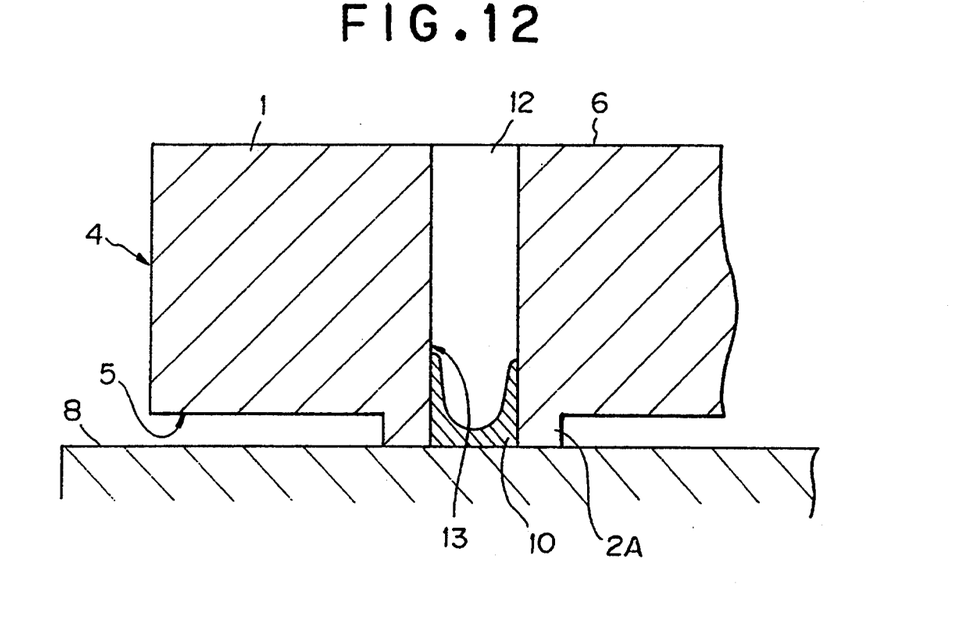
FIG. 12 is a partially enlarged vertical section of FIG. 11.

FIG. 12 is an enlarged vertical section showing the vicinity of a through-hole 12 of this embodiment. As shown in FIG. 12, the polygon mirror 1 is in contact with the mirror mounting table 8 by the projection 2A, and the adhesive 10 is injected in the through-hole 12. In this case, the adhesive 10 becomes hardened on the inner wall 13 of the through-hole 12, thus the polygon mirror 1 is securely fixed. Thus, the end face of the projection 2A and the surface of the mirror mounting table 8 can be brought into contact with each other and fixed together without allowing the adhesive 10 to enter the interface therebetween. Accordingly, no displacement of the polygon mirror 1 from a proper position would occur by the adhesive intruding into the interface, and consequently, divergence of the angles formed between individual mirror facets 4 and the mirror mounting table 8 would not occur.

The above embodiment was described in combination of the projections 2A to 2C with through-holes 12. However, in place of the through-holes 12, combination of the hollows 11 exemplified in FIGS. 6 and 7 with projections 2A to 2C can be employed to fix the polygon mirror 1 by injecting adhesive 10 in the same manner with the case of the through-holes 12 shown in FIGS. 10 to 12. This combination can be expected to yield an equivalent result with that of the through-hole 12.

The shapes in cross-section of the projections 2A to 2C, the hollows 11 and the through-holes 12 are shown by circles in FIG. 10 and other figures, but are not limited thereto, and any other shape such as squares or triangles can be adopted. In addition, the number of the members should not be limited to three as shown in the figures, but any number of the members may be allowed as long as it is plural. Nevertheless, with regard to the projections, at least three members are preferably provided. Further, concerning the cross-sectional area of the hollows 11 or through-holes 12, an arbitrary dimension can be selected as long as such characteristics as the practical strength of the polygon mirror 1 is not jeopardized.

In accordance with the embodiment shown by FIGS. 10 to 12, projections 2A to 2C are used in the same manner as in the embodiment of FIGS. 4 and 5, but the polygon mirror is fixed onto the mirror mounting table 8 by injecting the adhesive 10 into the through-holes 12 or hollows 11. Therefore, this embodiment require no mirror clamping member 9 unlike the embodiment shown in FIGS. 4 and 5, so there is no necessity for considering the fixing stress that would be caused by the clamping member 9.

In the all embodiments described heretofore, the polygon mirror 1 with six mirror facets 4 has been exemplified, but this should not limit the invention. In other words, the present invention is intended for polygonal mirrors for use in laser scanning optical systems, so polygon mirrors with any number of mirror facets can be employed as required.

As has been discussed above, according to the present invention, the mounted polygon mirror is free from the moment which would cause deformation of the polygon mirror, therefore, even the minute deformation of the polygon mirror as in a level of microns can be prevented, or deterioration of the mirror facet inclination error can be prevented. In addition, the polygon mirrors are fixed by injecting the adhesive into the hollows or through-holes, so that it is possible to prevent deterioration of the mirror facet inclination error which would be caused by the unevenness of the adhesive layer in the generally known adhering method in which adhesive is applied on the referential contact interface between the polygon mirror and the polygon mirror mounting table. Furthermore, the risk of mirror facets being stained by the adhesive is reduced as compared to the conventional case in which the adhesive is applied onto the entire referential surface orthogonal to the mirror facets when the polygon mirror is fixed.

In the case where the projections are provided to the polygon mirror when the polygon mirror is resin-formed, it is possible to form them in an integrated manner, so no particular clamping member is required for assembling, thus making it possible to reduce the cost by a large margin.

What is claimed is:

1. A polygon mirror made by resin-forming, provided with a plurality of first projections on its referential surface for attachment; and a plurality of second projections at positions corresponding to said first projections on its clamping member-receiving surface opposite said referential surface.

2. A polygon mirror according to claim 1, wherein the top flat area of said first projection on said referential surface for attachment is equal to or larger than that of said second projection on said clamping member-receiving surface.

3. A polygon mirror according to claim 1, wherein the number of said projections on one side is at least three.

4. A polygon mirror made by resin-forming, provided with a plurality of projections and hollow portions on its referential surface for attachment; wherein said hollow portions are arranged and disposed to penetrate into respective projections; and being characterized in that said hollow portions are filled with an adhesive in contact with said referential surface for attachment.

5. A polygon mirror according to claim 4, wherein the number of said projections on one side is at least three.

6. A polygon mirror made by resin-forming, provided with a plurality of projections and through holes on its referential surface for attachment; wherein said through holes are arranged and disposed to penetrate through respective projections; and being characterized in that said through holes are filled with an adhesive in contact with said referential surface for attachment.

7. A polygon mirror according to claim 6, wherein the number of said projections on one side is at least three.

* * * * *